United States Patent [19]

Le

[11] Patent Number: 4,924,510

[45] Date of Patent: May 8, 1990

[54] TELECOMMUNICATIONS DATABASE ACCESSING METHOD

[75] Inventor: Van-Ban Le, Naperville, Ill.

[73] Assignee: American Telephone and Telegraph Company, New York, N.Y.

[21] Appl. No.: 290,795

[22] Filed: Dec. 28, 1988

[51] Int. Cl.⁵ .............................................. H04M 3/42
[52] U.S. Cl. .................................... 379/221; 379/233; 379/222; 379/201
[58] Field of Search ............... 379/201, 207, 219, 220, 379/221, 222, 233, 94, 210, 211, 214

[56] References Cited

U.S. PATENT DOCUMENTS

| | | | |
|---|---|---|---|
| 4,191,860 | 3/1980 | Weber | 379/115 |
| 4,611,094 | 9/1986 | Asmuth et al. | 379/113 X |
| 4,757,267 | 7/1988 | Riskin | 379/201 X |

OTHER PUBLICATIONS

D. F. Stubbs et al., *Data Structures with Abstract Data Types and Pascal*, 1988, pp. 225-234.

M. C. Easton et al., "Use Bit Scanning in Replacement Decisions", *IEEE Transactions on Computers*, v. C-28, No. 2, Feb. 1979, pp. 133-141.

*Network Communications Applications & Services, AT&T 800 Service*, (brochure), AT&T Communications, Issue 1, Jun. 1984, pp. 1-25.

*Primary Examiner*—James L. Dwyer
*Attorney, Agent, or Firm*—Werner Ulrich

[57] ABSTRACT

Method and apparatus for reducing call setup time for calls to Advanced 800 customers by eliminating one database query. (Toll charges for 800 calls are paid by the called customer.) In the prior art, a call to an Advanced 800 customer required accessing a Basic 800 database, then, using data obtained therefrom, accessing an Advanced 800 database. In accordance with this invention, a table of the most frequently called Advanced 800 numbers and the corresponding data normally obtained from the Basic 800 database is dynamically maintained in each roll switching system. When an 800 call is received at a toll switching system, the table is examined to see if the Advanced 800 service accessing data is stored therein. If so, the advanced 800 database is directly accessed without first accessing the Basic 800 database; if not, the call is processed as in the prior art, plus updating the table if the call is to an Advanced 800 customer. Advantageously, such an arrangement reduces call setup time to frequently called Advanced 800 customers by about 1.5 seconds.

28 Claims, 4 Drawing Sheets

TELECOMMUNICATIONS DATABASE ACCESSING METHOD

TECHNICAL FIELD

This invention relates to methods and apparatus for accessing databases in a distributed database system of a telecommunication network.

PROBLEM

Inward Wide Area Telephone Service, otherwise known as 800 service, allows callers to call a destination customer of the service on a toll free basis. A special block of numbers prefixed by 800 has been set aside for this purpose. These 800 numbers have the attribute that there is no area code to indicate the portion of the country that is the destination for the call. This problem has been solved by creating a database that is queried for 800 calls to make a translation between a dialed 800 number and a destination. When a toll switch receives an 800 call, it sends a common channel signaling (CCS) message to an INWATS database or Basic 800 database. The message includes the area code from which the call originated. The INWATS database sends back an unlisted telephone number to the switch to route the call.

The 800 service has been enhanced by becoming an advanced 800 service which includes a large number of features including, for example, Call Prompter service which routes calls to customized recorded announcements based on a caller's additional dialed digit(s). A recorded announcement will request the caller to key a code number to specify the appropriate routing. The customer will specify a default route for invalid numbers or no response. The customer may also specify different routing for different times of the day or different days of the week or holidays. The Advanced 800 service requires a very large additional database. For economy of development effort, a separate database was established to store the data required for Advanced 800 customers. The 800 numbers for Advanced 800 customers and Basic 800 customers are in the same range so that it is not possible to examine that number in order to determine whether a particular 800 number represents Advanced 800 or Basic 800 service, unless a translation is provided in each toll switch for all 800 numbers, a solution which requires a large and costly additional translation database that must be frequently updated. Moreover, some customers switch from Basic 800 to Advanced 800 service and do not wish to have their 800 number changed at the time they make this switch. Consequently, Advanced 800 service is handled today by first querying the Basic 800 database; if Basic 800 service is being offered to the destination customer, then the basic translation, in this case, an unlisted ten digit number for routing the call, is provided. If the customer has Advanced 800 service the information that is provided is a special number which triggers a query to the Advanced 800 database when that number is translated at the switch. The toll switch handling the call then must request the Advanced 800 translation data from the Advanced 800 database, using that special number. This has the disadvantage of slowing down all Advanced 800 service calls by approximately 1.5 seconds, the period of time that has elapsed in handling the query to the basic 800 database and the response to this query. Such a long additional delay is considered undesirable, especially by large, frequently called Advanced 800 service customers. Consequently, a problem of the prior art is that all Advanced 800 service calls, and other calls having the property that the choice of a database must be identified through access of another database, are delayed by an appreciable period of time in order to make an extra database query, in order to identify the database where the desired information is to be found.

SOLUTION

In accordance with the principles of my invention, illustratively, each toll switch maintains a list of the most frequently dialed Advanced 800 or other service numbers and before making the initial database access, checks that list to see if the list contains information as to where the data for the desired number is to be found, Illustratively, both the initial database and the Advanced 800 database are shared among a plurality of toll switches. Advantageously, maintenance of such a list avoids the necessity for accessing the initial database in a large fraction of the times that the initial database would have to be otherwise queried. Advantageously, the table responds to the dynamic characteristics of the traffic, thus requiring no engineering and ensuring that the table contains those entries most likely to be of use.

In accordance with one specific embodiment of the invention, each entry has an associated bit indicator. This indicator is initially zero, and kept at that value when an entry is first made in the table. The indicator is set to one on any subsequent reference to the corresponding entry. A new entry may be made where the corresponding indicator is in the unmarked or reset state. Marked indicators are reset when hunting for an available slot for a new entry. A circular pointer is used to indicate which indicator is to be examined first when a new entry is to be placed in the table, the pointer being advanced after every reset action and after making a new entry. Advantageously, such an arrangement ensures that the most frequently used numbers are maintained in the table most of the time.

In accordance with another aspect of the invention, the table is cleared from time to time. Advantageously, such an arrangement ensures that the data for such table is up to date since the response from the basic data table is required to form every entry in the table.

In accordance with another aspect of the invention, the table provides individualized data, otherwise provided by the Basic 800 database for each Advanced 800 number in response to the initial database entry, for making the subsequent database query. In another application, this data represents the identification of one of a plurality of databases. Advantageously, providing this individualized data makes it possible to avoid the query of the initial (Basic 800) database.

In accordance with another aspect of this invention, an AVL tree structure is used to link the entries in the table. Advantageously, such an arrangement provides an efficient arrangement for hunting for entries in the table, and for deleting old entries and adding new entries.

In accordance with another aspect of the invention, the toll switch maintains a list of customer identification numbers and corresponding data. The list is checked on an incoming call to see whether the customer identification number corresponds to a member of the list; if so, the same type of actions are performed, namely, bypassing an initial database query and substituting the corresponding data from the list for the data that would otherwise be fetched from the initial database.

Accordingly, this invention relates to methods and apparatus for accessing a first database means in response to a request, and, responsive to a class of responses from the first database means, accessing a second database means, wherein, responsive to prescribed information in the request, the accessing of the first database means is bypassed.

DETAILED DESCRIPTION

Figure 1:
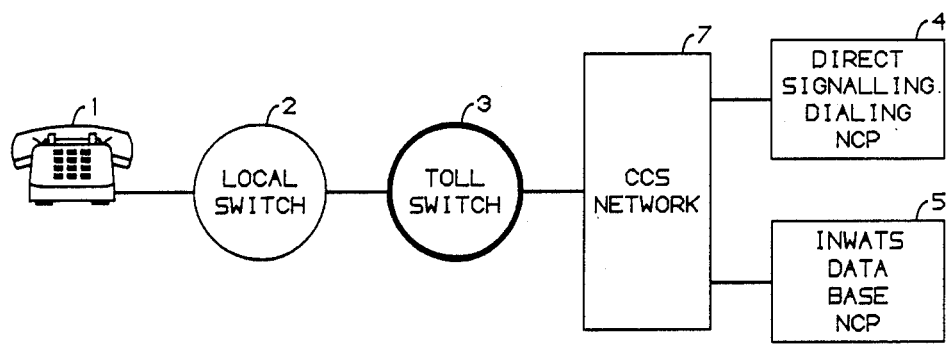
FIG. 1 is a block diagram of an arrangement of switching systems and databases for implementing the present invention.

FIG. 1 is a diagram illustrating the operation of prior art systems. A customer at customer station 1 dials an 800 number into a local switch 2. The local switch forwards this number to toll switch 3. Toll switch 3 recognizing that this is an 800 number first queries INWATS database network control point 5 to find the data required to route the basic 800 service call or to find out the customer has dialed an Advanced 800 number and to fetch a number for accessing the Advanced 800 database. If the customer has dialed an Advanced 800 number, the toll switch 3 receives a response from INWATS database network control point 5. After translating the returned number, the toll switch recognizes that the call is an Advanced 800 call, and sends a query comprising the returned number to network control point 4 to obtain the information needed to process the Advanced 800 call.

Figures 2, 3:
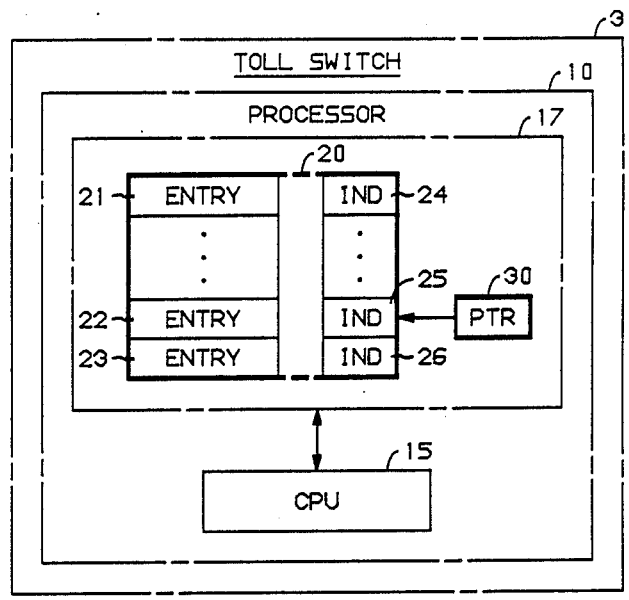
FIG. 2 is a more detailed diagram of one of the switches showing a processor and a table in the processor.
FIG. 3 is an example of entries in that table.

FIG. 2 illustrates the improvement of the present invention. Toll switch 3 has a processor 10 comprising a central processing unit 15 and a memory 17. In the memory 17 is a table 20. This table has a plurality of entries, 21, ... ,22,23, each comprising an 800 number and a special number, for example, a number with prefix 195, for accessing or querying network control point 4 and each with an associated indicator 24, ... ,25,26. When toll switch 3 receives a call setup request comprising an 800 number, it selectively accesses NCP 4 by first hunting over table 20, and comparing the received number with each entry of the table, to see if that 800 number is in table 20. If so, toll switch 3 directly accesses the direct signaling dialing (DSD) network control point (NCP) 4. This request is transmitted over a common channel signaling (CCS) network 6. Alternately, if the number is not in the table 20, then processor 10 queries INWATS database NCP 5. If NCP 5 responds with a number which triggers a query to DSD NCP 4, then processor 10 not only sends a query message to NCP 4, but also inserts a corresponding entry in table 20 so that the next time the same Advanced 800 number is dialed there is likely to be an entry in table 20 and the toll switch 3 will not be required to query NCP 5.

Memory 17 of processor 10 also comprises a pointer 30 for maintaining a record of which indicator has been most recently examined for the purpose of inserting a new entry. Each entry of table 20 comprises an 800 number, a corresponding special number for querying network control point 4; and AVL tree structure data 28 used for hunting an entry in table 20 and for deleting an entry and inserting a new entry in table 20. This process is described with respect to FIG. 5.

A typical example of the numeric part of the entries in the table 20 is shown in FIG. 3. Three entries are shown representing the numbers 800-222-2323 (entry 21), 800-275-2457 (entry 22) and 800-287-1930 (entry 23), and their corresponding special numbers, 195-123-1111, 195-123-2222, and 195-123-3333, respectively. The corresponding indicators for these three entries are zero, one, and zero. The zero for indicator 24 indicates that the corresponding number (entry 22) 800-287-1930 had not been processed since the last time that its indicator had been reset. The one for indicators 24 and 26 indicates that the corresponding entries 21 and 23, telephone numbers 800-222-2333 and 800-287-1930, had been processed since the last time indicators 24 and 26 were reset. If, for example, at this point a request was made for processing a telephone call with a dialed number 800-274-1233, a number not currently in table 20, the database 5 would be queried. If the response from database 5 indicated that this number was for a customer who had Advanced 800 service, and returned the special number 195-123-4444, then the number 274-1233 and the special number 195-123-4444 would be substituted for entry 23, as discussed below with respect to FIG. 5. The indicator 26 is not marked when an entry is made to ensure that a rarely dialed Advanced 800 number is not retained for a long time in table 20.

Figure 4:
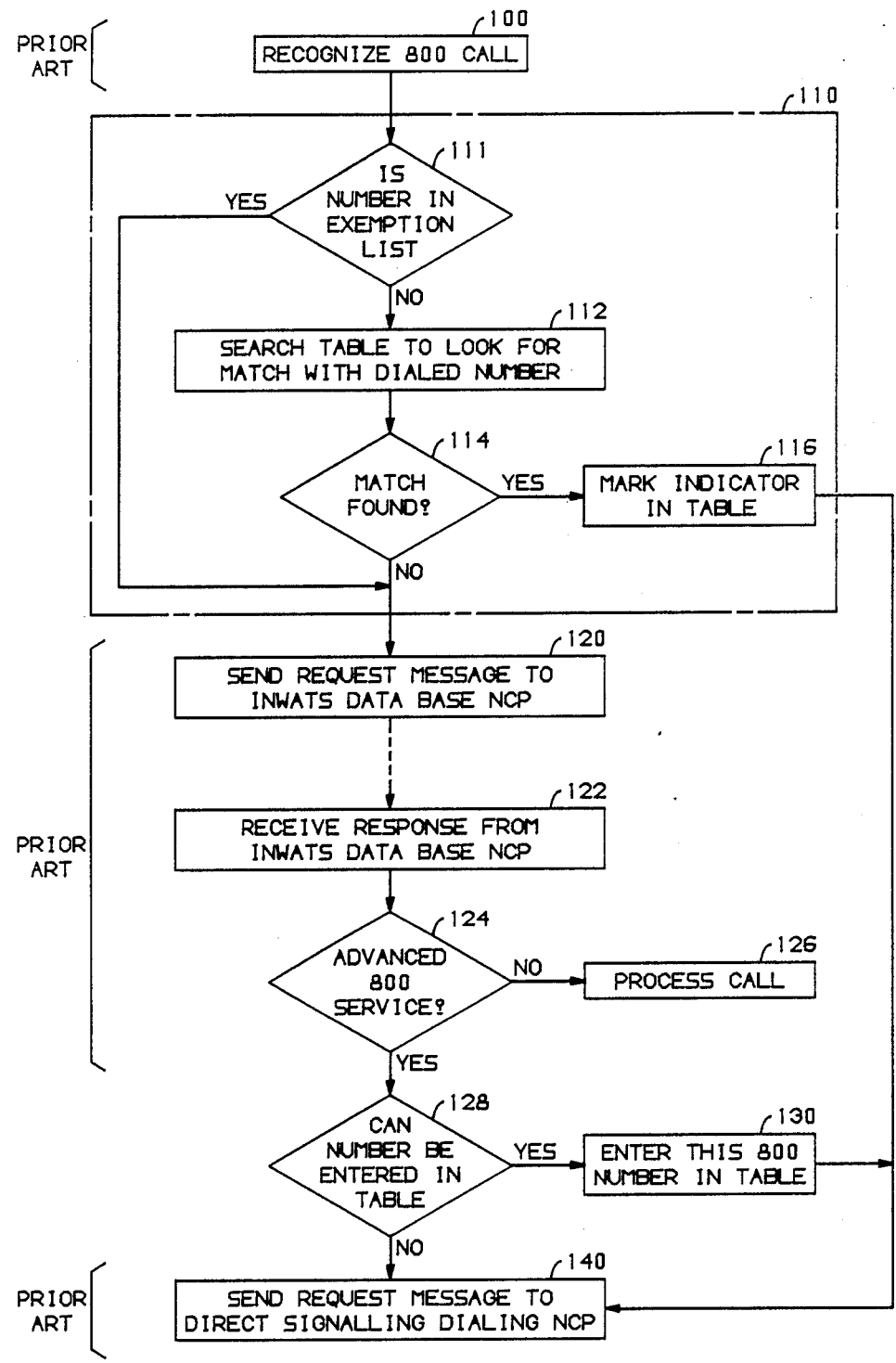
FIGS. 4-6 are flow diagrams for a method of implementing the invention.

FIG. 4 is a flow diagram of the pertinent programs and actions for processing 800 calls. Only the blocks indicated as being within dashed lines 110, and blocks 128 and 130 (the latter being described more fully with respect to FIG. 5) are new. The rest represent present arrangements for processing 800 calls. A toll switch recognizes that it must process an 800 call by checking the first three digits of the called number (action block 100). Then, in accordance with the invention, the actions of blocks 111, 112, 114 and 116 indicated inside dashed line 110 are executed. Each toll switch 3 maintains a short list of numbers which are exempted from the process initiated by action block 112. The 800 number is first compared with all the numbers in this exemption (test 111). If the 800 number does not match any of these numbers, then action block 112 is entered. If the 800 number does match one of the numbers on the exemption list, then a request is immediately sent to the INWATS database NCP (action block 120). The purpose of the exemption list is to permit traffic data to be accumulated at the INWATS database NCP for monitoring and analysis of dialing patterns to INWATS customers experiencing trouble.

The table 20 is searched to look for a match between the dialed number and an entry in the table (action block 112). Test 114 checks to see whether a match was found. If so, then the indicator corresponding to that entry is marked in the table (action block 116) and the toll switch directly accessed NCP 4 by sending a request message to NCP 4 thus bypassing the need to send a request message to NCP 5. Effectively, this process selectively accesses NCP 4 directly if the match is found. If no match is found, then, in accordance with the practice of the prior art, a request message is sent to NCP 5 (action block 120). After a response is received from NCP 5 (action block 122), this response is then translated to see if the response indicates Advanced 800 service (test 124). If not, the call is processed, again, in accordance with the methods of the prior art (action block 126).

If the result of test 124 is that Advanced 800 service is detected, then a new test 128 is performed to see if the 800 number of this call is a number that can be entered in table 20 (test 128). This test is based on information returned from NCP 5. It may be desirable for offering certain services to provide a feature wherein toll switch 3 receives data both from the NCP 5 and NCP 4; for these services, it is important not to bypass the orginal request for data from the NCP 5. If the result of test 128 is negative, i.e., that the number cannot be entered into table 20, then action block 130 is bypassed and the request message is sent to NCP 4 (action block 140). Otherwise, action block 130 is executed. The actions of this block are indicated in greater detail in FIG. 5 but consist substantially of entering this 800 number in the table. Action block 130 is also new. Following action block 130 or in response to having found a match in the table in test 114, a request message is sent to NCP 4 to fetch the data needed to process the particular Advanced 800 service call.

Figure 5:
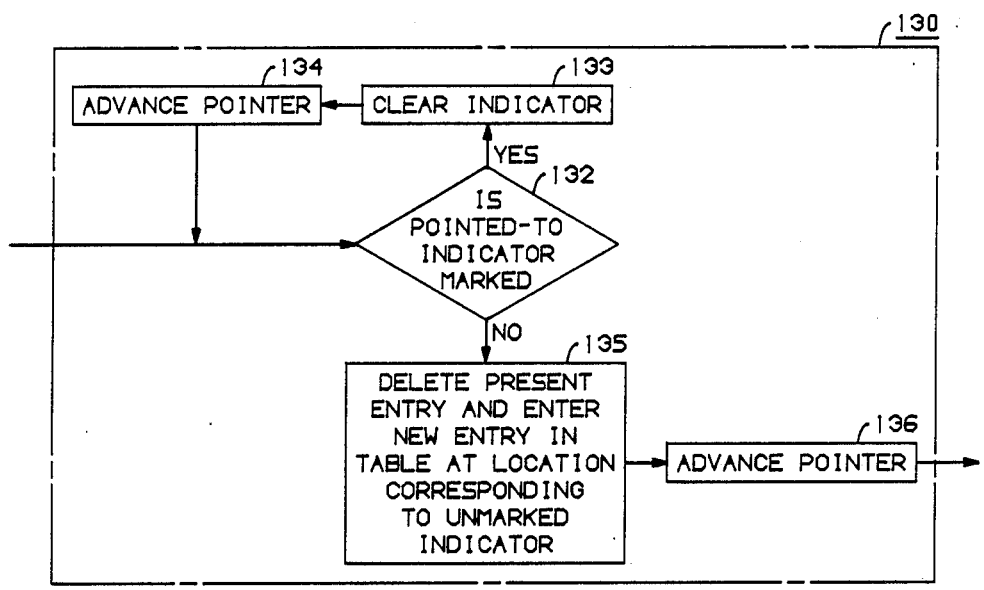

FIG. 5 is an expansion of block 130. Each entry in table 20 corresponds to a node of an AVL tree. AVL trees are well known in the prior art and are described, for example, in D. F. Stubbs et al.: *Data Structures,* Brooks Cole Publishing Company, 1985, pages 225–234. The processes of hunting for an entry in such a tree structure, deleting an entry from such a tree structure, and adding such an entry to such a tree structure are all well-known straightforward processes which can be carried out in a small number of steps proportional to the logarithm (base 2) of the total number of nodes on the tree. In this case, each node of the tree corresponds to one entry (an 800 number and a special number for querying NCP 4 and AVL tree data) in table 20. The AVL tree data 281 (and corresponding data for other entries) comprises pointers to successor entries (nodes of the tree) and an indicator of whether the successor tree is balanced, longer to the left, or longer to the right. The successor node pointers are used in hunting for an entry. The process of hunting for an entry comprises the steps of checking whether the entry in the parent node is equal, greater, or less than the entry being hunted, and if no match is found, repeating the process for the successor node corresponding to the greater or lesser condition as found in the test. This process is repeated until a match is found or until no successor nodes exist; in the first case, the entry is on the list and in the second case, there is no entry corresponding to the number being hunted.

When an existing entry is to be deleted and another entry is to be substituted, this process takes place in two phases. First, the numeric entry of the selected node is deleted from the tree structure and the tree is re-balanced. Next the substitute entry is inserted in its proper position within the tree structure and the tree is re-balanced. The tree is balanced after every insertion and deletion. This maintains an optimum hunting time and simplifies subsequent deletions and insertions.

A pointer 30 is maintained for examining the indicators in an ordered fashion and is arranged to be a circular pointer such that the first indicator is examined after the last indicator has been examined. When a new entry is to be inserted into the data structure of table 20 a search is made for an unmarked indicator. The first step is to fetch the indicator designated by the pointer 30 and to test that indicator to see if it is marked (test 132). If so, the indicator is unmarked (action block 133), the pointer advanced (action block 134) and test 132 repeated for the indicator now pointed to by the pointer. If the indicator is unmarked, then the entry, if any, corresponding to that indicator is deleted from the tree data structure, the new entry is entered in the slot corresponding to the selected indicator and the balanced tree data structure is updated (action block 135). The pointer is then advanced (action block 136).

In the example of FIG. 3, the pointer 30 originally points to indicator 25, which is marked. This indicator is cleared, and the pointer advanced to point to indicator 26. This indicator is unmarked. The entry is then made in memory location 23, corresponding to indicator 26, indicator 26 remains unmarked until the number 800-274-1233 is later received in toll switch 3.

Figure 6:
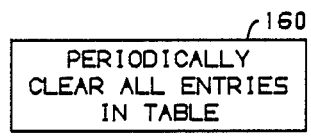

FIG. 6 indicates that periodically, perhaps once per day sometime after midnight, all entries in the table are cleared. This ensures that 800 numbers for which the translation data has changed are not maintained indefinitely in table 20.

This approach can also be used for accessing a database for serving software defined networks. For large customers, the data describing their software defined network is spread over several databases. When a call is received from such a large customer, an initial database is accessed. This search may lead to a request to access a different database. The identity of this different database is stored in a table, similar to table 20. In this case, the table is searched using the called directory number as received by toll switch 3. Subsequent calls having the same caller directory number, which may represent a group of callers within the private network, can then directly access the correct database.

It is to be understood that the above description is only of one preferred embodiment of the invention. Numerous other arrangements may be devised by one skilled in the art without departing from the spirit and scope of the invention. The invention is thus limited only as defined in the accompanying claims.

I claim:

1. A method of accessing first and second database means for a switching system for routing a first or second type of call, comprising:

in response to receipt of a first or second type of call, selectively accessing said second database means directly in response to data of said first or second type of call and data stored in said switching system, for deriving routing data for a second type of call;

alternately, accessing said first database means for deriving routing data for a first type of call; and subsequently accessing said second database means, in response to receiving one of a class of responses from said first database means, for deriving routing data for a second type of call.

2. In a system comprising a telecommunications switching system and a first and a second database means, a method of accessing said first and second database means for said switching system for routing a first or second type of call, comprising:

in response to receipt of a first or second type of call, selectively accessing said second database means directly from said switching system in response to data of said first or second type of call and to data stored in said switching system, for deriving routing data for a second type of call;

alternately, accessing said first database means from said switching system for deriving routing data for a first type of call;

transmitting data from said first database means to said switching system;

subsequently accessing said second database means from said switching system, in response to data received from said first database means, for deriving routing data for a second type of call;

responsive to said steps of alternately accessing said first database means and subsequently accessing said second database means, storing data in said switching system for said second type of call for which data was accessed from said first database means and said second database means, whereby a subsequent second type of call having the same data of said second type of call will not require accessing said first database means.

3. The method of claim 2 wherein said data of said first or second type of call comprises a number, and wherein said step of storing data comprises the step of:

storing said number in a list of numbers, and wherein said step of selectively accessing comprises the steps of:

comparing said number against said list of numbers; and if said comparison yields a match, directly accessing said second database means.

4. The method of claims 1 or 2 wherein said data of said first or second type of call comprises a number, wherein said data stored in said system comprises a list of numbers, and wherein said selectively accessing step comprises the steps of:

comparing said number against said list of numbers; and if said comparison yields a match, directly accessing said second database means.

5. The method of claim 4 wherein said data stored in said system comprises data corresponding to each of the numbers of said list, and wherein said selectively accessing step further comprises the step of:

if said comparison yields a match, fetching said data of said system, corresponding to a number of said list matching said number of said call, for accessing the second database means.

6. The method of claim 4 wherein said comparing step comprises the step of:

comparing a called number of said data of said first or second type of call against said list of numbers.

7. The method of claim 4 wherein said comparing step comprises the step of:

comparing a calling customer identification number of said data of said first or second type of call against said list of numbers.

8. The method of claim 4 wherein said comparing step comprises the step of:

hunting in said list of numbers for said number of said call, wherein said list of numbers is organized in an AVL tree structure.

9. The method of claim 4 wherein said list comprises a plurality of entries, each entry having a different number, further comprising the step of:

if said comparison yields a match, marking an indicator corresponding to an entry of said list which matches said number of said call setup request.

10. The method of claim 4 wherein said selectively accessing step comprises the step of:

accessing said second database means via a common channel signaling network.

11. The method of claim 1 wherein said data of said first or second type of call comprises a number, wherein said data stored in said system comprises a list of numbers, and wherein said selectively accessing step comprises the steps of:

comparing said number against said list of numbers; and if said comparison yields a match, directly accessing said second database means;

and further comprising the step of:

responsive to said steps of alternately accessing said first database means and subsequently accessing said second database means, storing data in said list for said second type of call for which data was alternately accessed from said first database means and subsequently accessed from said second database means, whereby a subsequent second type of call having the same number of said second type of call will not require accessing said first database means.

12. The method of claims 3 or 11 wherein said list comprises a plurality of entries each having a corresponding indicator, each indicator having a marked and an unmarked state, and wherein said step of storing data comprises the steps of:

searching for an unmarked indicator; and storing an entry in said list in an entry location of said list corresponding to said unmarked indicator.

13. The method of claim 12 wherein said searching step comprises the steps of:

examining an indicator specified by a pointer;

if said indicator specified by said point is marked, setting that indicator to unmarked, advancing said pointer and repeating said examining step;

if said indicator specified by said pointer is unmarked terminating the search.

14. The method of claim 12 wherein said step of storing an entry comprises the step of:

advancing a point for specifying which indicator is to be examined in said searching step.

15. The method of claim 12 further comprising the step of:

if said comparison yields a match, marking an indicator corresponding to an entry of said list which matches said number of said call setup request.

16. In a switching system, apparatus for controlling the accessing of first and second database means in response to receiving a call setup request, comprising:

means for storing data;

means responsive to data on the call setup request and to said data stored in said system for selectively directly accessing the second database means; and means for accessing the first database means in the absence of said data on the call setup request and said data stored in said system for specifying a direct access of the second database means; and means responsive to a class of responses from the first database means, for accessing the second database means.

17. The system of claim 16 wherein said means for storing data comprises:

means for storing a table, said table comprising a plurality of entries, each entry comprising a number; and wherein said data of said call setup request comprises a number; and wherein said means for directly accessing comprises:
means for comparing said number of said call setup request against numbers comprised in entries of said table; and
means responsive to said means for comparing for directly accessing said second database means if said comparing yields a match.

18. The system of claim 17 wherein each entry of said table further comprises data for accessing said second database means.

19. The system of claim 17 wherein said table comprises data for organizing said plurality of entries in an AVL tree structure.

20. The system of claim 17 further comprising an indicator corresponding to each entry of said plurality of entries.

21. The system of claim 20 wherein said means for comparing comprises means for marking one of said indicators corresponding to an entry of said plurality comprising a number which matches said number of said call setup request.

22. The system of claim 17 wherein said means responsive to a class of responses from the first database means for accessing the second database means comprises means for making an entry comprising the number of the call setup request.

23. The system of claim 22 further comprising a plurality of indicators each corresponding to one of the entries, each indicator having a marked and an unmarked state, wherein said means for making an entry comprises means for searching for an unmarked indicator and means for making the entry in the list in an entry location of the list corresponding to the unmarked indicator.

24. The system of claim 23 wherein the means for searching comprises:
a pointer for pointing to one of the indicators;
means for examining an indicator specified by the pointer; and
if the indicator is unmarked, making an entry in the corresponding entry location of the list; and
if the indicator is marked, setting the indicator to unmarked, advancing the pointer, and examining an indicator specified by the pointer.

25. The system of claim 23 wherein the means for searching comprises a pointer for pointing to one of the indicators; and
the means for making an entry comprises means for advancing the pointer.

26. The system of claim 22 wherein said means for comparing comprises means for marking an indicator corresponding to an entry of the list which matches the number of the call setup request.

27. The system of claim 17 wherein the means for accessing the second database means comprises means for sending messages to a common channel signaling network.

28. A method of accessing first and second database means in response to a call setup request comprising a number for a special service call comprising the steps of:
hunting in a list of numbers for said number of said call setup request, wherein said list of numbers is organized in an AVL tree structure;
if said hunting finds said number in one of the entries of the list, each entry having a corresponding indicator having a marked and an unmarked state, marking an indicator corresponding to that entry of said list and fetching data of that entry corresponding to that number for accessing the second database means;
accessing the second database means via a common channel signaling network;
if said hunting does not find said number in said list, accessing the first database means via a common channel signaling network;
responsive to receiving one of a class of responses from the first database means, accessing the second database means;
responsive to receiving said one of a class of responses from the first database means, making an entry comprising said number of said call setup request and data received from the first database means in said list;
wherein the step of making an entry comprises the steps of:
searching for an unmarked indicator;
making said entry in said list in an entry location corresponding to said unmarked indicator; and
advancing a pointer for specifying which indicator is to be examined in said searching step;
wherein the searching step comprises the steps of:
examining an indicator specified by said pointer;
if said indicator specified by said pointer is marked, setting that indicator to unmarked, advancing said pointer and repeating said examining step; and
if said indicator specified by said pointer is unmarked, terminating the search.

* * * * *